United States Patent
Kolar et al.

(10) Patent No.: US 10,361,624 B2
(45) Date of Patent: Jul. 23, 2019

(54) MULTI-CELL POWER CONVERTER WITH IMPROVED START-UP ROUTINE

(71) Applicant: Infineon Technologies Austria AG, Villach (AT)

(72) Inventors: Johann Kolar, Zürich (CH); Matthias Kasper, Zürich (CH)

(73) Assignee: Infineon Technologies Austria AG, Villach (AT)

( * ) Notice: Subject to any disclaimer, the term of this patent is extended or adjusted under 35 U.S.C. 154(b) by 57 days.

(21) Appl. No.: 15/370,879

(22) Filed: Dec. 6, 2016

(65) Prior Publication Data

US 2018/0159424 A1 Jun. 7, 2018

(51) Int. Cl.
*H02M 1/36* (2007.01)
*H02J 3/36* (2006.01)
*H02M 1/42* (2007.01)
*H02M 3/335* (2006.01)
*H02M 5/22* (2006.01)
(Continued)

(52) U.S. Cl.
CPC ............... *H02M 1/36* (2013.01); *H02J 3/36* (2013.01); *H02M 1/4208* (2013.01); *H02M 3/33584* (2013.01); *H02M 5/225* (2013.01); *H02M 2001/008* (2013.01); *H02M 2001/0074* (2013.01); *H02M 2001/0077* (2013.01); *H02M 2007/4835* (2013.01); *Y02B 70/126* (2013.01)

(58) Field of Classification Search
CPC .. H02M 1/36; H02M 1/4208; H02M 3/33584; H02M 5/225; H02M 2001/0074; H02M 2001/0077; H02M 2001/008; H02M 2001/4835; H02J 3/36; Y02B 70/126

USPC ...... 363/17, 21.1, 21.11, 21.18, 35, 37, 124, 363/125, 127, 131, 132
See application file for complete search history.

(56) References Cited

U.S. PATENT DOCUMENTS 6,246,596 B1 * 6/2001 Yamazaki ............... H02M 1/36
323/901
7,046,534 B2 * 5/2006 Schmidt .................. H02M 7/48
363/132

(Continued)

OTHER PUBLICATIONS

Everts, Jordi et al., "Comparative Evaluation of Soft-Switching, Bidirectional, Isolated AC/DC Converter Topologies", 2012 Twenty-Seventh Annual IEEE Applied Power Electronics Conference and Exposition (APEC), Orlando, FL, Feb. 5-9, 2012, pp. 1067-1074.

(Continued)

*Primary Examiner* — Matthew V Nguyen
*Assistant Examiner* — Nusrat Quddus
(74) *Attorney, Agent, or Firm* — Murphy, Bilak & Homiller, PLLC

(57) ABSTRACT

A power converter circuit includes a plurality of first converter cells, a plurality of second converter cells, and a plurality of DC link capacitors. Each of the plurality of first converter cells is coupled to a corresponding one of the plurality of DC link capacitors. Each of the plurality of second converter cells is coupled to a corresponding one of the plurality of DC link capacitors. At least one of the plurality of second converter cells is configured to, during start-up of the power converter, internally dissipate power received from the corresponding DC link capacitor while a cell output power of the at least one of the plurality of second converter cells is substantially zero.

22 Claims, 8 Drawing Sheets

(51) Int. Cl.
*H02M 1/00* (2006.01)
*H02M 7/483* (2007.01)

(56) References Cited

U.S. PATENT DOCUMENTS

| | | | | |
|---|---|---|---|---|
| 7,212,419 | B2* | 5/2007 | Vinciarell | H02M 3/157 |
| | | | | 307/82 |
| 8,238,128 | B2* | 8/2012 | Falk | H02M 7/44 |
| | | | | 363/124 |
| 2012/0300514 | A1* | 11/2012 | Kolar | H02J 3/1857 |
| | | | | 363/41 |
| 2013/0201727 | A1* | 8/2013 | Kolar | H02J 3/01 |
| | | | | 363/17 |
| 2016/0072397 | A1* | 3/2016 | Deboy | H02M 3/33592 |
| | | | | 363/21.1 |
| 2016/0294276 | A1* | 10/2016 | Onishi | H02M 1/36 |

OTHER PUBLICATIONS

Krismer, Florian et al., "Closed Form Solution for Minimum Conduction Loss Modulation of DAB Converters", IEEE Transactions on Power Electronics, vol. 27, No. 1, Jan. 2012, pp. 174-188.

* cited by examiner

US 10,361,624 B2

MULTI-CELL POWER CONVERTER WITH IMPROVED START-UP ROUTINE

TECHNICAL FIELD

This disclosure in general relates to a power converter and, more particularly, a multi-cell power converter.

BACKGROUND

A multi-cell power converter includes a plurality of first converter cells coupled to an input and a plurality of second converter cells coupled to at least one output. During normal operation of the multi-cell power converter, each of the first converter cells charges a corresponding DC link capacitor and each of the second converter cells receives power from a corresponding DC link capacitor to provide an output power at the at least one output.

During normal operation of the multi-cell power converter, the first or second converter cells may actively regulate the DC link voltages across the individual DC link capacitors. There are types of multi-cell power converters in which the first converter cells are connected in series between input nodes of the multi-cell power converter and in which the first converter cells are implemented such that during a start-up of the multi-cell power converter, the DC link capacitors are connected in series between the input nodes to form a capacitive voltage divider. During start-up, the first converter cells do not actively regulate the DC link voltages and a sum of the DC link voltages essentially corresponds to a peak of an input voltage received at the input. During normal operation, the DC link capacitors not only buffer electric energy received via the first converter cells from the input and forwarded via the second converter cells to the at least one output, but may also act as power supplies from which the first and second converter cells receive power required for a proper operation.

During the start-up, the first and second converter cells start to receive power from the DC link capacitors. The power consumptions of the individual converter cells may be different so that the individual DC link capacitors may be discharged differently. This may result in an imbalance of the DC link voltages during start-up. Such imbalance may include an increase of the DC link voltage of one or more DC link capacitors to above a voltage blocking capability of semiconductor devices implemented in the converter cells connected to the respective DC link capacitor(s). This may cause the semiconductor devices to be damaged or destroyed.

There is therefore a need to balance the DC link voltages in a multi-cell power converter during start-up.

SUMMARY

One embodiment relates to a power converter circuit. The power converter circuit includes a plurality of first converter cells, a plurality of second converter cells, and a plurality of DC link capacitors. Each of the plurality of first converter cells is coupled to a corresponding one of the plurality of DC link capacitors, each of the plurality of second converter cells is coupled to a corresponding one of the plurality of DC link capacitors, and at least one of the plurality of second converter cells is configured to, during start-up of the power converter, internally dissipate power received from the corresponding DC link capacitor while a cell output power of the at least one of the plurality of second converter cells is substantially zero.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
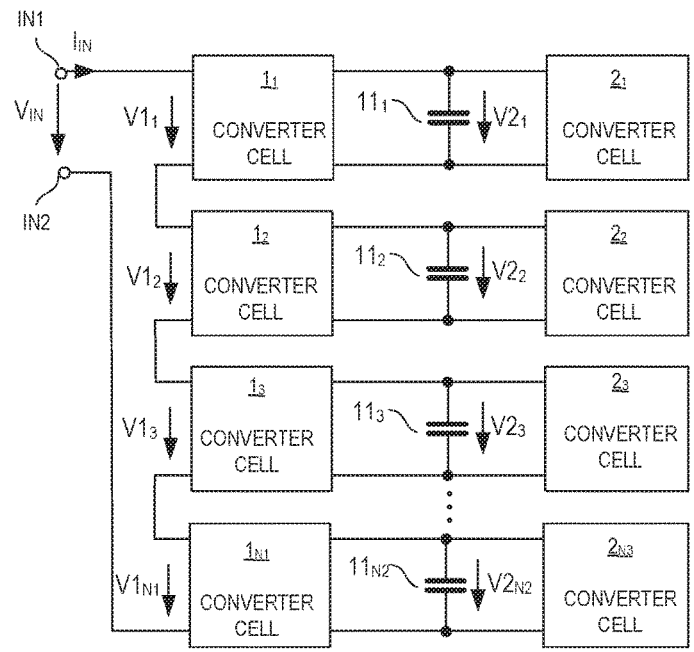
FIG. 1 shows a circuit diagram of a multi-cell power converter with a plurality of first converter cells and a plurality of second converter cells according to one example.

FIG. 1 shows a circuit diagram of a multi-cell power converter circuit according to one example. This power converter circuit includes a plurality of first converter cells $1_1$-$1_{N1}$ (which may also be referred to as input converter cells), a plurality of second converter cells $2_1$-$2_{N3}$ (which may also be referred to as output converter cells), and a plurality of DC link capacitors $11_1$-$11_{N2}$. Each of the plurality of first and second converter cells $1_1$-$1_{N1}$, $2_1$-$2_{N3}$ includes a cell input and a cell output. Further, each of the plurality of first converter cells $1_1$-$1_{N1}$ is coupled to a corresponding one of the plurality of DC link capacitors $11_1$-$11_{N2}$ and each of the plurality of second converter cells $2_1$-$2_{N3}$ is coupled to a corresponding one of the plurality of DC link capacitors $11_1$-$11_{N2}$. More specifically, the cell output of each of the plurality of first converter cells $1_1$-$1_{N1}$ is coupled to a corresponding one of the plurality of DC link capacitors $11_1$-$11_{N2}$ and the cell input of each of the plurality of second converter cells $2_1$-$2_{N3}$ is coupled to a corresponding one of the plurality of DC link capacitors $11_1$-$11_{N2}$.

Capacitances of the individual DC link capacitors $11_1$-$11_{N2}$ are dependent on several aspects, such as a waveform of an input voltage $V_{IN}$. According to one example, the capacitances of the DC link capacitors $11_1$-$11_{N2}$ are selected from a range of between several microfarads (μF), such as 2 uF, and several millifarads (mF), such as 9 mF.

In the example shown in FIG. 1, a number N1 of first converter cells equals a number N3 of second converter cells and equals a number N2 of DC link capacitors (N1=N2=N3) so that each of the DC link capacitors $11_1$-$11_{N2}$ has a corresponding one of the first converter cells $1_1$-$1_{N1}$ and a corresponding one of the second converter cells $2_1$-$2_{N3}$ coupled thereto. This, however is only an example. According to another example (shown in FIG. 2), there is at least one DC link capacitor that only has a first converter cell, but not a second converter cell coupled thereto.

The power converter circuit shown in FIG. 1 is implemented with an IS (Input Serial) topology. In this case, the cell inputs of the first converter cells $1_1$-$1_{N1}$ are connected in series between a first input node IN1 and a second input node IN2 of an input of the power converter circuit. That is, a first cell input node of one of the plurality of first converter cells (the converter cell $1_1$ in the example shown in FIG. 1) is connected to the first input node IN1. A second cell input node of another one of the plurality of first converter cells (the first converter cell $1_{N1}$ in the example shown in FIG. 1) is connected to the second input node IN2 of the power converter circuit. The other first converter cells (the first converter cells $1_2$, $1_3$ shown in FIG. 1) each have their first cell input node connected to the second cell input node of another first converter cell, and have their second cell input node connected to the first cell input node of another first converter cell. In other words, the cell inputs of the individual first converter cells $1_1$-$1_{N1}$ form a cascade between the first and second input nodes IN1, IN2 of the power converter circuit.

The cell outputs of the second converter cells $2_1$-$2_{N3}$ are not illustrated in FIG. 1. There are various ways to couple (or not couple) these cell outputs. According to one example shown in FIG. 2, the cell outputs of the second converter cells $2_1$-$2_{N3}$ are connected in parallel at an output of the power converter circuit. That is, a first cell output node of each second converter cell $2_1$-$2_{N3}$ is connected to a first output node OUT1 of the power converter circuit and a second cell output node of each of the second converter cells $2_1$-$2_{N3}$ is connected to a second output node OUT2 of the power converter circuit. A multi-cell converter circuit with second converter cells $2_1$-$2_{N3}$ having their cell outputs connected in parallel in the way shown in FIG. 3 can be referred to as a multi-cell power converter circuit with an OP (Output Parallel) topology. Consequently, a power converter circuit with an IS topology shown in FIG. 1 and an OP topology shown in FIG. 2 can be referred to as multi-cell power converter with an ISOP (Input Serial, Output Parallel) topology.

Figures 2, 3, 4:
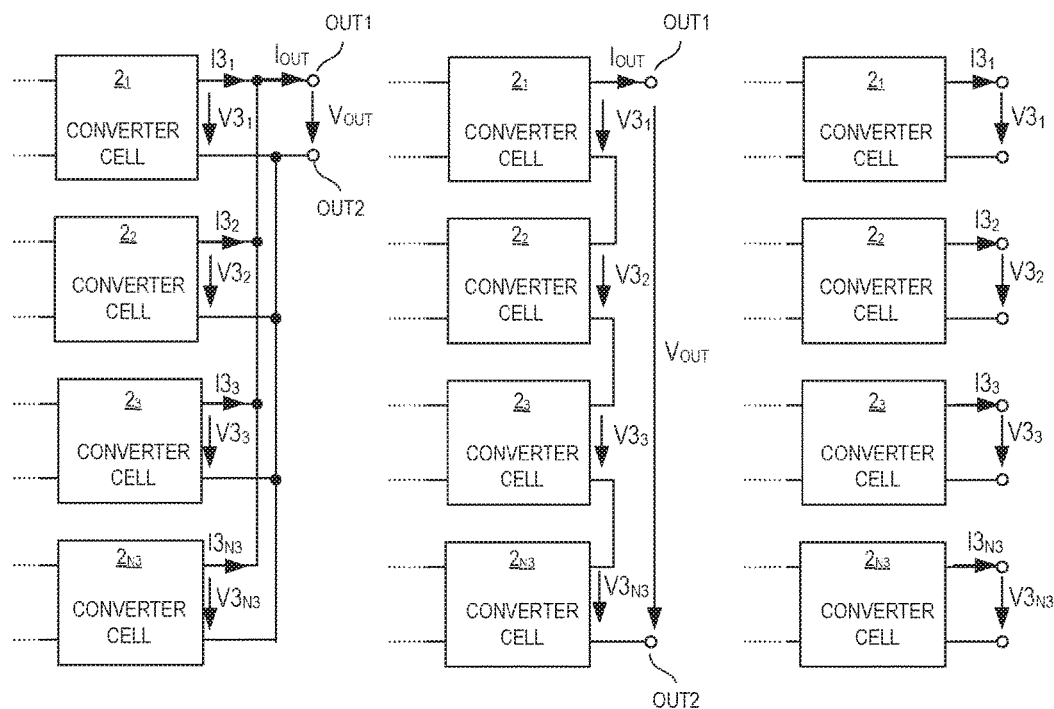
FIGS. 2 to 4 illustrate different examples of how cell outputs of the second converter cells may be connected.

According to another example shown in FIG. 3, the second converter cells $2_1$-$2_{N3}$ have their cell outputs connected in series between the first and second output nodes OUT1, OUT2. A multi-cell power converter having the cell outputs of the second converter cells $2_1$-$2_{N3}$ connected in series in the way shown in FIG. 3 can be referred to as multi-cell power converter with an OS (Output Serial) topology. Consequently, a power converter circuit with an IS topology as shown in FIG. 1 and an OS topology as shown in FIG. 3 can be referred to as power converter circuit with an ISOS (Input Serial, Output Serial) topology.

According to another example, shown in FIG. 4, the cell outputs of at least two of the second converter cells $2_1$-$2_{N3}$ are separate. In the example shown in FIG. 4, the cell output of each of the second converter cells $2_1$-$2_{N3}$ is separate from the cell output of each of the other converter cells. A power converter having the cell outputs of the second converter cells $2_1$-$2_{N3}$ connected in the way shown in FIG. 4 can be referred to as power converter with an OSEP (Output SEParate) topology. Consequently, a power converter circuit with an IS topology as shown in FIG. 1 and an OSEP topology as shown in FIG. 4 can be referred to as power converter with an ISOSEP (Input Serial, Output SEParate) topology. In a power converter with an ISOSEP topology, the cell output of each of the second converter cells $2_1$-$2_{N3}$ forms one of several outputs of the power converter circuit.

The multi-cell power converter circuit can operate in a normal mode. In the normal mode, the power converter circuit receives an input power from a power source (not shown in FIG. 1) at the input IN2, IN2 and supplies an output power to a load (not shown in FIGS. 2-4) coupled to the at least one output of the power converter. The input power is given by an input voltage $V_{IN}$ applied between the first and the second input nodes IN1, IN2 multiplied with an input current $I_{IN}$ received by the plurality of the first converter cells $1_1$-$1_{N1}$ from the input IN1, IN2. In a power converter with an IS topology, each of cell input voltages $V1_1$-$V1_{N1}$ of the individual first converter cells $1_1$-$1_{N1}$ is a share of the input voltage $V_{IN}$, whereas a sum of the individual cell input voltages $V1_1$-$V1_{N1}$ essentially equals the input voltage $V_{IN}$ received by the power converter circuit. That is, $$\Sigma_{i=1}^{N1} V1_i = V_{IN} \quad (1).$$

Figures 5A, 5B, 5C:
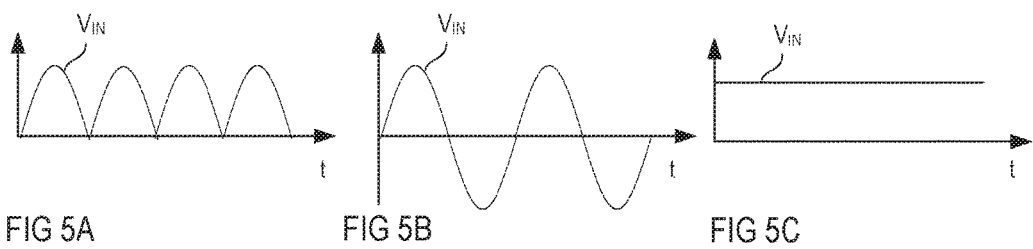
FIGS. 5A to 5C show signal diagrams of different types of input voltages the multi-cell power converter may receive.
Figure 6:
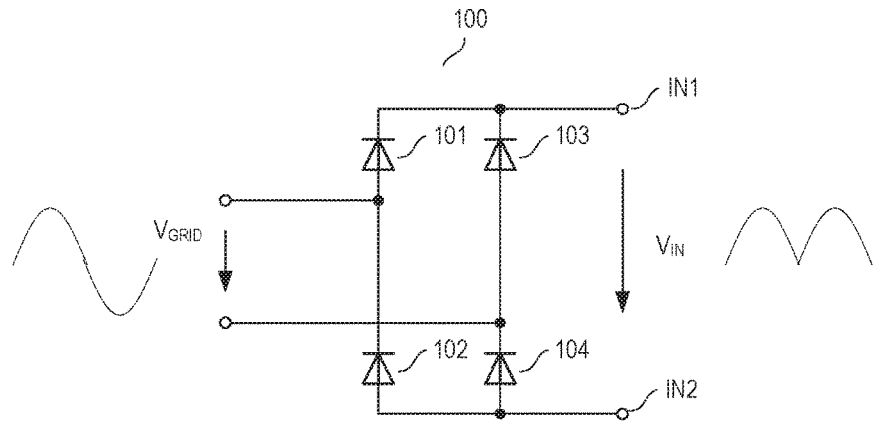
FIG. 6 shows one example of a rectifier circuit that is optionally connected downstream an input of the multi-cell power converter.

The input voltage $V_{IN}$ can be selected from a variety of different types of input voltages. According to one example shown in FIG. 5A, the input voltage $V_{IN}$ is a rectified sinusoidal voltage. According to another example, shown in FIG. 5B, the input voltage $V_{IN}$ is a sinusoidal voltage. According to yet another example, shown in FIG. 5C, the input voltage $V_{IN}$ is a direct voltage. A rectified sinusoidal voltage as shown in FIG. 5A may be generated from a sinusoidal grid voltage $V_{GRID}$ by a rectifier circuit. One example of a rectifier circuit configured to generate a rectified sinusoidal voltage from a sinusoidal voltage is shown in FIG. 6. This rectifier circuit is implemented as a bridge rectifier circuit 100 with four rectifier elements 101-104 connected in a bridge configuration. Such bridge rectifier circuit can be connected downstream the input IN1, IN2, receive a grid voltage $V_{GRID}$ and provide a rectified sinusoidal voltage at the input IN1, IN2 of the power converter circuit. Such bridge rectifier can be omitted if the input voltage $V_{IN}$ is a direct voltage or if the power converter circuit is capable of processing a sinusoidal input voltage.

According to one example, in the normal mode, the first converter cells $1_1$-$1_{N1}$ are configured to regulate DC link voltages $11_1$-$11_{N2}$ across the DC link capacitors $11_1$-$11_{N2}$. According to one example, the plurality of first converter cells $1_1$-$1_{N1}$, in the normal mode operate as a boost converter so that a total DC link voltage, which is a sum of the individual DC link voltages $V2_1$-$V2_{N2}$, is higher than the input voltage $V_{IN}$ or a peak of the input voltage $V_{IN}$. According to yet another example, the first converter cell $1_1$-$1_{N1}$ have a PFC (power factor correction) function and do not only regulate the DC link voltages $V2_1$-$V2_{N2}$, but also regulate a wave form of the input current $I_{IN}$. Those functions and how to implement them in a multi-cell power converter with an IS topology are known so that no further explanations are required in this regard.

The multi-cell power converter circuit is configured to operate in one of several operation modes, whereas these several operation modes at least include a normal operation mode (which is briefly referred to as normal mode in the following) and a start-up mode. According to one example, in the normal node, the second converter cells $2_1$-$2_{N3}$ are configured to receive power from the DC link capacitors $11_1$-$11_{N2}$ and provide an output power at the at least one output. In a power converter with an OP topology or OS topology as shown in FIGS. 2 and 3, respectively, the second converter cells $2_1$-$2_{N3}$ supply one output power at the one output OUT1, OUT2. The output power is defined by an output voltage $V_{OUT}$ provided between the first and second output nodes OUT1, OUT2 multiplied with an output current $I_{OUT}$. In a power converter with a OP topology, cell output voltages $V3_1$-$V3_{N3}$ of the individual second converter cells $2_1$-$2_{N3}$ equal the output voltage $V_{OUT}$, and a sum of cell output currents $I3_1$-$I3_{N3}$ equals on overall output current $I_{OUT}$, that is, $$\Sigma_{i=1}^{N3} I3_i = I_{OUT} \qquad (2).$$

In a power converter with a OS topology, each of the cell output currents $I3_1$-$I3_{N3}$ of the second converter cells equals the output current lour of the multi-cell power converter and each of the cell output voltages $V3_1$-$V3_{N3}$ of the individual second converter cells $2_1$-$2_{N3}$ is a share of the output voltage $V_{OUT}$, wherein the sum of the cell output voltages $V3_1$-$V3_{N3}$ essentially equals the output voltage $V_{OUT}$. That is, $$\Sigma_{i=1}^{N3} V3_i = V_{OUT} \qquad (3).$$

In a power converter with an OSEP topology, the second converter cells $2_1$-$2_{N3}$ each supply an output power given by a cell output voltage $V3_1$-$V3_{N3}$ multiplied with a cell output current $I3_1$-$I3_{N3}$ to separate loads (not shown in FIG. 4). The output powers of the individual second converter cells $2_1$-$2_{N3}$ can be independent from each other.

In the normal node, the output voltages $V3_1$-$V3_{N3}$ of the second converter cells $2_1$-$2_{N3}$ and, therefore, the at least one output power, of the power converter circuit is different from zero. According to one example, the power converter circuit, before operating in the normal mode, operates in the start-up mode. In the start-up mode, an input voltage $V_{IN}$ different from zero is applied between the first and second input nodes IN1, IN2, but the first converter cells $1_1$-$1_{N1}$ do not yet regulate the DC link voltages $V2_1$-$V2_{N2}$. Further, cell output voltages $V3_1$-$V3_{N3}$ and, therefore, cell output powers of the individual second converter cells $2_1$-$2_{N3}$ are substantially zero in the start-up mode.

Figure 7:
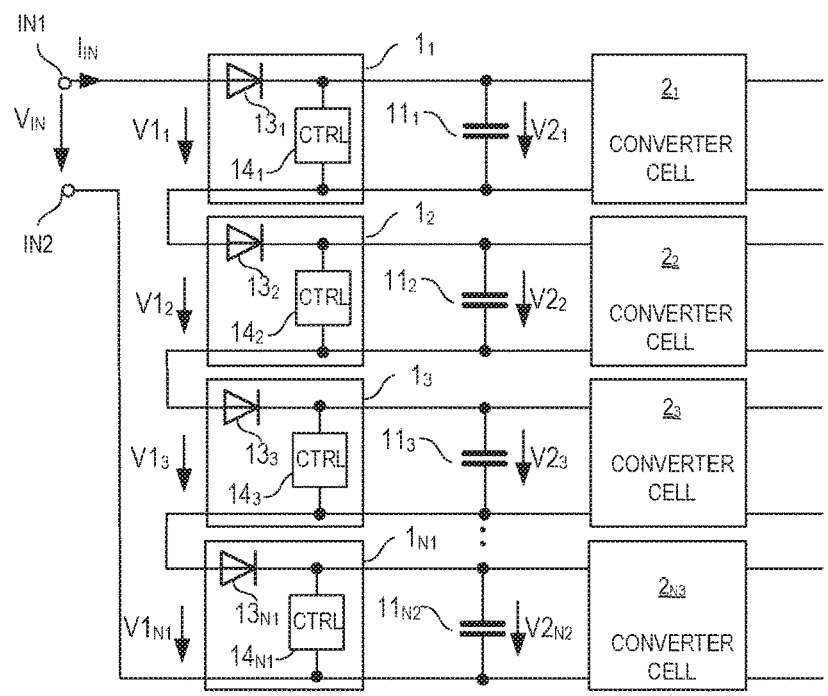
FIG. 7 illustrates a current path through the first converter cells during a start-up of the multi-cell power converter.

According to one example illustrated in FIG. 7, internal circuits of the first converter cells $1_1$-$1_{N1}$ are such that in the start-up mode the first converter cells $1_1$-$1_{N1}$ connect the DC link capacitors $11_1$-$11_{N2}$ in series between the first input nope IN1 and the second input node IN2. Referring to FIG. 7, each of the plurality of first converter cells $1_1$-$1_{N1}$ may include a rectifier element $13_1$-$13_{N1}$, such as a diode, coupled between a first cell input node and a first cell output node of the respective first converter cell $1_1$-$1_{N1}$ and making it possible for the DC link capacitors $11_1$-$11_{N2}$ to be charged when an input voltage $V_N$ different from zero is applied between the first and second input nodes IN1, IN2. The rectifier elements $13_1$-$13_{N1}$ rectify the input voltage $V_{IN}$ such that an overall DC link voltage $V2_{TOT}$, which is the sum of the individual DC link voltages $V2_1$-$V2_{N2}$, substantially equals a peak voltage level of the input voltage $V_{IN}$ (if the forward voltages of the rectifier elements $13_1$-$13_{N1}$ are negligible). That is, $$\Sigma_{i=1}^{N2} V2_i = V2_{TOT} = \hat{V}_{IN} \qquad (3),$$

where $\hat{V}_{IN}$ denotes the peak level of the input voltage $V_{IN}$.

The first converter cells $1_1$-$1_{N1}$ include further electronic devices. These electronic devices, however, are not active during the start-up mode so that these electronic devices are not illustrated in FIG. 7. Examples of these further electronic devices and of how they are connected are explained herein further below. In the normal mode, these electronic devices are controlled by control circuits $14_1$-$14_{N1}$ included in the individual first converter cells $1_1$-$1_{N1}$. These control circuits $14_1$-$14_{N1}$ are powered by the DC link capacitors $11_1$-$11_{N2}$ so that each control circuit $14_1$-$14_{N1}$ has a power supply input that is connected to the corresponding DC link capacitor $11_1$-$11_{N2}$. More specifically, each control circuit $14_1$-$14_{N1}$ has a first power supply input node connected to a first circuit node of the corresponding DC link capacitor $11_1$-$11_{N2}$ and a second power supply input node connected to a second circuit node of the corresponding DC link capacitor $11_1$-$11_{N2}$. During the start-up mode, the control circuits $14_1$-$14_{N1}$ start to receive power from their corresponding the DC link capacitor $11_1$-$11_{N2}$, wherein this electrical power may be needed by the control circuits $14_1$-$14_{N1}$ to enter the normal operation mode, that is, to regulate the DC link voltages $V3_1$-$V3_{N2}$. The second converter cells $2_1$-$2_{N3}$ also include control circuits (not shown in FIG. 7) that are powered by the DC link capacitors $11_1$-$11_{N2}$ and start to receive electric power from the DC link capacitors $11_1$-$11_{N2}$ during the start-up mode. As the power consumptions of the individual control circuits (in the first converter cells $1_1$-$1_{N1}$ as well as in the second converter cells $2_1$-$2_{N3}$) might be different, the situation may occur that the DC link capacitors $11_1$-$11_{N2}$ are discharged differently during the start-up mode. This may result in an imbalance of the individual DC link voltages $V2_1$-$V2_{N2}$ (while the overall DC link voltage is given by the peak voltage level of the input voltage $V_{IN}$ in accordance with equation (3)). The control circuits of the first and second converter cells $1_1$-$1_{N1}$, $2_1$-$2_{N3}$ may be designed to withstand a maximum voltage level. According to one example, this maximum voltage level is given by the regulated DC link voltage $V2_1$-$V2_{N2}$ of the corresponding DC link capacitor $11_1$-$11_{N2}$ during the normal mode plus an optional safety margin. It is undesirable for the DC link voltage of one or more of the DC link capacitors $11_1$-$11_{N2}$ to rise above the pre-defined maximum voltage level. It is therefore desirable, in the start-up mode, to prevent the DC link voltages $V2_1$-$V2_{N2}$ from reaching the predefined maximum voltage level. The predefined maximum voltage levels may be the same for the individual DC link capacitors or may be different.

At least one of the second converter cells $2_1$-$2_{N3}$ is configured, in the start-up mode, to internally dissipate power received from the corresponding DC link capacitor $11_1$-$11_{N2}$ in order to limit the voltage across the corresponding DC link capacitor. In the following, $2_i$ denotes an arbitrary one of the second converter cells $2_1$-$2_{N3}$ configured to internally dissipate power, $11_i$ denotes the corresponding DC link capacitor, and $V2_i$ denotes the DC link voltage across the DC link capacitor $11_i$, and $P2_{DISSi}$ denotes the power internally dissipated in the second converter cell. The internally dissipated power $P2_{DISSi}$ is given by the energy $E_{DISSi}$ dissipated within a certain time period divided through a duration $T_{DISS}$ of this time period.

According to one example, the second converter cell $2_i$ is configured to measure the corresponding DC link voltage $V2_i$ and internally dissipate power only if the voltage level of the DC link voltage is higher than a threshold level $V2_{THi}$. That is, $$P2_{DIssi}=0 \text{ if } V2_i \le V2_{THi} \tag{4a}$$

$$P2_{DISSi}>0 \text{ if } V2_i > V2_{THi} \tag{4b}.$$

According to one example, the internally dissipated power is substantially constant. According to another example, the internally dissipated power $P2_{DIssi}$ is dependent on the DC link voltage $V2_i$ and increases as the DC link voltage $V2_i$ increases or as a difference between the DC link voltage $V2_i$ and the threshold voltage increases. According to one example, the dissipated power $P2_{DIssi}$ is proportional to this difference, so that $$P2_{DISSi}=k1(V2_i-V2_{THi}) \tag{5},$$

where k1 is a constant proportionality factor and where the internally dissipated power $P_{DISSi}$, in accordance with equation (4b), is zero if the DC link voltage $V2_i$ is below the threshold $V2_{THi}$.

Figure 8:
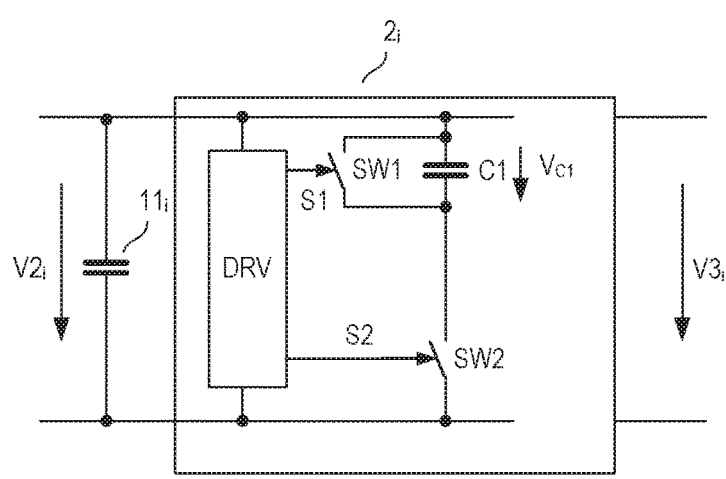
FIG. 8 shows one example of a second converter cell configured to internally dissipate power during start-up.

One example of a second converter cell $2_i$ configured to internally dissipate power received from the corresponding DC link capacitor $11_i$ is illustrated in FIG. 8. According to one example, each of the second converter cells $2_1$-$2_{N3}$ is implemented in accordance with the example shown in FIG. 8. In the example shown in FIG. 8, the second converter cell $2_i$ includes a first capacitor C1 and a first electronic switch SW1 connected in parallel with the first capacitor C1. In this second converter cell $2_i$, internally dissipating power includes charging the first capacitor C1 with electric charge received from the corresponding DC link capacitor $11_i$, and discharging the first capacitor C1 by switching on the first electronic switch SW1. Each time the electronic switch SW1 is switched on, the electrical energy stored in the first capacitor C1 is dissipated in inherent electric resistances of the electronic switch S1 and connection lines between the first capacitor C1 and the electronic switch SW1. According to one example, the first capacitor C1 is charged by switching on a second electronic switch SW2 connected in series with the first capacitor C1, whereas a series circuit that includes the first capacitor C1 and the second electronic switch SW2 is connected in parallel with the DC link capacitor $11_i$. The energy dissipated in the first switch SW1 each time the first switch SW1 discharges the first capacitor C1 equals a capacitance of the first capacitor C1 multiplied with the square of a voltage $V_{C1}$ across the first capacitor C1 before it has been discharged. This voltage $V_{C1}$ may substantially equal the DC link voltage $V2_i$, so that the energy $E_{DIssi}$ dissipated by charging and subsequently discharging the capacitor C1 is given by, $$E_{DIssi}=V2_i^2 \cdot C1 \tag{6},$$

where C1 also denotes the capacitance of the capacitor.

Figure 9:
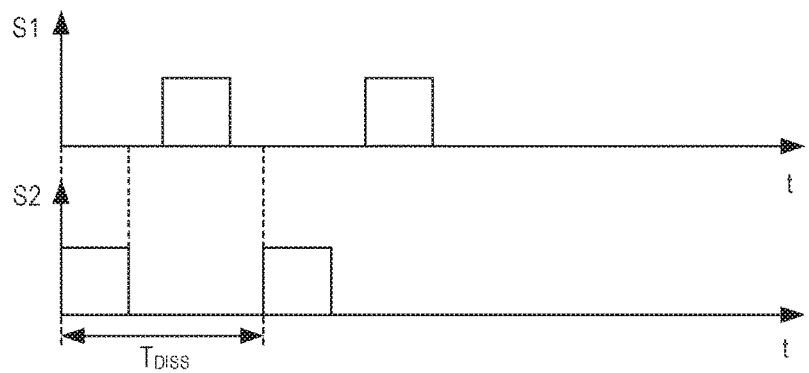
FIG. 9 shows timing diagrams that illustrate one way of operating of the second converter cell shown in FIG. 8.

Referring to FIG. 8, the first switch SW1 and the second switch SW2 are driven by a drive circuit DRV that generates a first drive signal S1 configured to drive the first switch SW1 and a second drive signal S2 configured to drive the second switch SW2. According to one example shown in FIG. 9, the drive circuit DRV drives the first switch SW1 and the second switch SW2 in a plurality of successive drive cycles, which will be referred to as dissipation cycles in the following. In each of these dissipation cycles, the drive circuit DRV switches on the second switch SW2 once in order to charge the first capacitor C1 and, subsequently, switches on the first switch S1 in order to discharge the first capacitor C1 and dissipate electrical energy. FIG. 9 illustrates timing diagrams of the first and second drive signals S1, S2. Each of these drive signals S1, S2 can have an on-level that switches on the corresponding switch SW1, SW2 and an off-level that switches off the corresponding switch SW1. SW2. Just for the purpose of illustration, an on-level is drawn as a high signal level and an off-level is drawn as a low signal level in the timing diagrams shown in FIG. 9. In FIG. 9, $T_{DISS}$ denotes the duration of one dissipation cycle, wherein in each dissipation cycle the drive circuit DRV first switches on the second switch SW2 in order to charge the first capacitor C1 and then, after the second switch SW2 has been switched off, switches on the first switch SW1 in order to discharge the first capacitor C1. According to one example, there is a delay time (dead time) between switching off the second electronic switch SW2 and switching on the first electronic switch SW1 in order to safely prevent a short-circuit between the circuit nodes of the DC link capacitor $11_i$.

In the dissipation circuit shown in FIG. 8 and operated in accordance with FIG. 9, the dissipated power is given by $E_{DISSi}/T_{DISS}$, where $E_{DISSi}$ is given by equation (6), for example, and $T_{DISS}$ is the duration of one dissipation cycle. In this example, the internally dissipated power $P2_{DISSi}$ can be increased by reducing the duration $T_{DIS}$ of one dissipation cycle, which is equivalent to increasing a frequency at which the first capacitor C1 is charged (by switching on the second switch SW2) and discharged (by switching on the first switch SW1). This frequency can be referred to as dissipation frequency $f_{DISS}$, wherein $f_{DISS}=1/T_{DISS}$. An increase of the internally dissipated power $P2_{DISSi}$ dependent on the DC link voltage $V2_i$ or dependent on a difference between the DC link voltage $V2_i$ and the threshold voltage $V2_{THi}$ can be obtained by increasing the dissipation frequency $f_{DISS}$ dependent on the DC link voltage $V2_i$ or dependent on a difference between the DC link voltage $V2_i$ and the threshold voltage $V2_{THi}$. According to one example, the dissipation frequency $f_{DISS}$ is proportional to the difference between the DC link voltage $V2_i$ and the threshold voltage $V2_{THi}$, $$f_{DISS}=k2\cdot(V2_i-V2_{THi}) \tag{7},$$

where k2 is a constant proportionality factor, in order to obtain that, in accordance with equation (6), the internally dissipated power $P2_{DISSi}$ is proportional to the difference between the DC link voltage $V2_i$ and the threshold voltage $V2_{THi}$.

Figure 10:
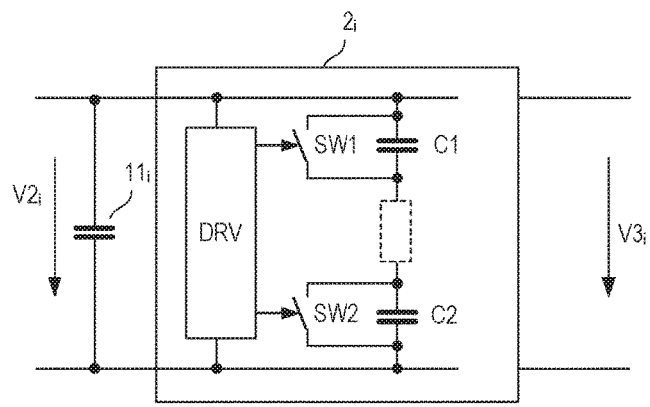
FIG. 10 shows another example of a second converter cell configured to internally dissipate power during start-up.

FIG. 10 shows a modification of the dissipation circuit implemented in the second converter cell $2_i$ shown in FIG. 8. In this example, the dissipation circuit includes a second capacitor C2 connected in parallel with the second switch SW 2. The first switch SW1 and the second switch SW2 may be driven by the drive circuit DRV in the way explained with reference to FIG. 9. The function of the dissipation circuit shown in FIG. 10 is different from the function of the dissipation circuit shown in FIG. 8 in that, additionally to the first capacitor C1, the second capacitor C2 is cyclically charged and discharged in order to dissipate energy. The second capacitor C2 is charged each time the first switch SW1 is switched on and the second switch SW2 is switched off and discharged each time the second switch SW2 is switched on and the first switch SW1 is switched off. In the dissipation circuit shown in FIG. 10 more energy than in the dissipation circuit shown in FIG. 8 can be dissipated within the same time period, if the first capacitor C1 has the same capacitance in both of these dissipation circuits. If, for example, the second capacitor C2 has the same capacitance as the first capacitor C1 and both the dissipation circuit shown in FIG. 8 and the dissipation circuit shown FIG. 10 are operated at the same dissipation frequency, in the dissipation circuit shown in FIG. 10, in one dissipation period, twice the energy of the dissipation circuit shown in FIG. 8 is dissipated.

The dissipation circuits illustrated in FIGS. 8 and 10 can be part of the power converters implemented in the second converter cells $2_1$-$2_{N3}$ and configured, in the normal operation mode, to convert power received from the corresponding DC link capacitor $11_1$-$11_{N2}$ into power provided at the corresponding cell output. Examples of how the converter cells $2_1$-$2_{N3}$ may be implemented are explained with reference to FIGS. 11 and 12 herein below.

Figure 11:
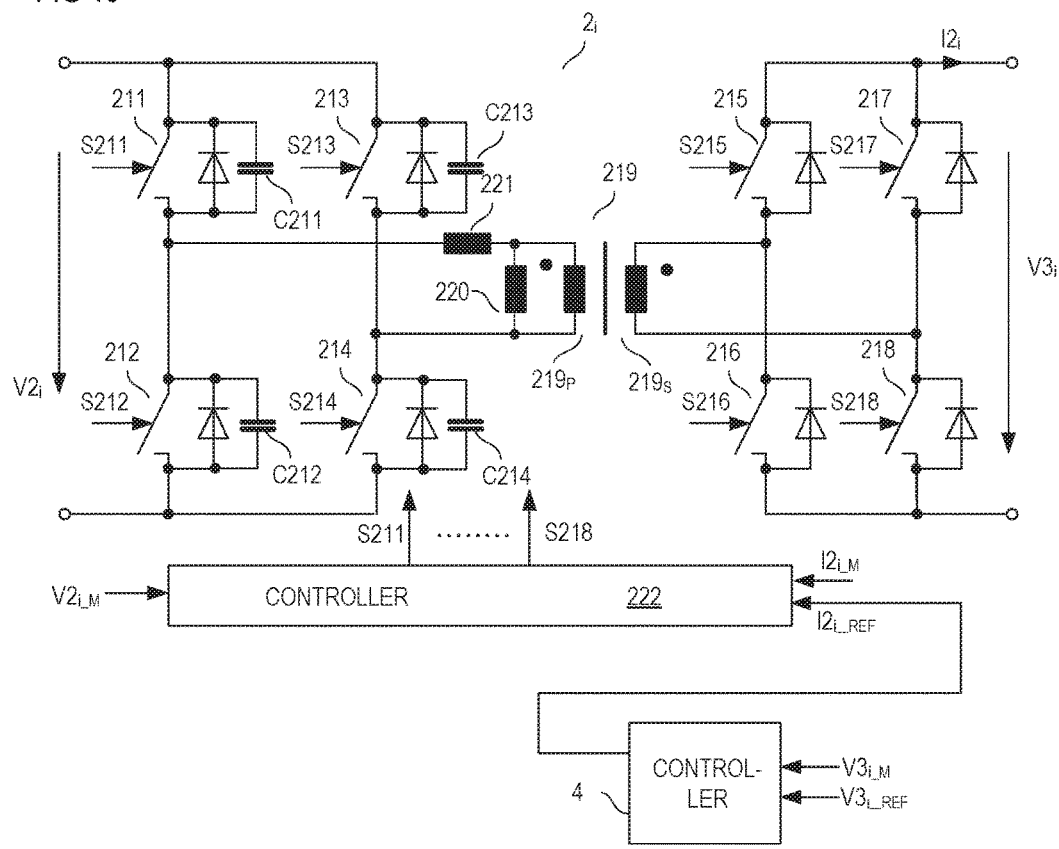
FIG. 11 shows one possible implementation of the second converter cells.

FIG. 11 shows one example of a second converter cell $2_i$. This second converter cell $2_i$ includes a power converter with a dual active bridge (DAB) topology coupled between a cell input where the DC link voltage $V2_i$ is received, and a cell output where, in the normal mode, a cell output voltage $V3_i$ different from zero is provided. This type of second converter cell may be used in a multi-cell power converter with an ISOP topology or an ISOSEP topology. A power converter with a DAB topology is disclosed in FIGS. 2a and 2b of Everts. J.; Krismer, F.; Van den Keybus, J.; Driesen, J.; Kolar, J. W., "Comparative evaluation of soft-switching, bidirectional, isolated AC/DC converter topologies," Applied Power Electronics Conference and Exposition (APEC), 2012 Twenty-Seventh Annual IEEE. pp. 1067-1074, 5-9 Feb. 2012, which is disclosed herein by reference in its entirety. In particular, FIG. 11 shows one example of a converter cell $2_i$ implemented with a "full bridge-full bridge DAB topology" as disclosed in Everts et al.

Referring to FIG. 11, the converter cell $2_i$ includes a first (full) bridge circuit with a first and a second half-bridge each including a high-side switch 211, 213 and a low-side switch 212, 214. The half-bridges of the first bridge circuit are connected between the cell input nodes for receiving the respective DC link voltage $V2_i$. A series circuit with an inductive storage element 221 and a primary winding 219p of a transformer 219 is connected between output nodes of the two half bridges 211, 212 and 213, 214. An output node of one half-bridge is a circuit node common to the high-side switch 211, 213 and the low-side switch 212, 214 of the half-bridge. The transformer 219 provides for a galvanic isolation between the cell input and the cell output, wherein the cell output is connected to the output OUT1, OUT2 of the power converter circuit. The transformer 219 includes a secondary winding 219s which is inductively coupled with the primary winding $219_P$. A further inductive storage 220 element drawn in parallel with the primary winding 219p in FIG. 11 represents the magnetizing inductance of the transformer 219.

A second bridge circuit with two half bridges each including a high-side switch 215, 217 and a low-side switch 216, 218 is coupled between the secondary winding $219_S$ and cell output nodes of the cell output. Each of these half-bridges 215, 216, and 217, 218 includes an input, which is a circuit node common to the high-side switch 215, 217 and the low-side switch 216, 218 of the respective half-bridge. The input of a first half-bridge 215, 216 of the second bridge circuit is connected to a first node of the secondary winding 219s, and the input of a second half-bridge 217, 218 of the second bridge circuit is connected to a second node of the secondary winding 219s. The half-bridges of the second bridge circuit are each connected between the cell output nodes.

The switches 211-214, 215-218 of the first and second bridge circuits shown in FIG. 11 may each be implemented to include a rectifier element (freewheeling element), such as a diode, connected in parallel with the switch. These switches can be implemented as known electronic switches, such as MOSFETs (Metal-Oxide Field-Effect Transistors), IGBTs (Insulated Gate Bipolar Transistors), JFETs (Junction Field-Effect Transistors), HEMTs (High-Electron-Mobility Transistors), or the like. When the switches 211-214, 215-218 are each implemented as a MOSFET, an internal body diode of the MOSFETs can be used as rectifier element, so that no additional rectifier element is required.

A control circuit 222 controls operation of the two bridge circuits. For this, each of the switches 211-214, 215-218 receives an individual drive signal from the control circuit 222. These drive signals are referred to as S211-S214 and S215-S218 in FIG. 8. In the normal mode, the control circuit 222 receives an output current signal $I2_{i\_M}$ and an output current reference signal $I2_{i\_REF}$. The output current signal represents $I2_{i\_M}$ represents a current level of an output current $I2_i$ of the second converter cell $2_i$ and may be obtained by measuring the output current $I2_i$ using a current measurement circuit (not shown in FIG. 11). The output current reference signal $I2_{i\_REF}$ represents a desired current level of the output current $I2_i$. The output current measurement signal may be provided by another control circuit 4 dependent on an output voltage measurement signal $V3_{i\_M}$ that represents the output voltage $V3_i$ and an output voltage reference signal $V3_{i\_REF}$ that represents a desired voltage level of the output voltage $V3_i$. The control circuit 222 may be configured, in the normal mode, to drive the switches 211-214, 215-218 such that the current level of the output current $I3_i$ substantially corresponds to the current level defined by the reference signal $I2_{i\_REF}$. There are several ways to drive the switches 211-214, 215-218 to obtain this. According to one embodiment, a duty cycle of the individual switches 211-214, 215-218 is modulated in the region of 50%. For details on controlling the switches, reference is made to F. Krismer, J. W. Kolar, "Closed form solution for minimum conduction loss modulation of DAB converters", IEEE Transactions on Power Electronics, Vol. 27. Issue 1, 2012, which is incorporated herein by reference in its entirety.

In a multi-cell power converter with an OP topology there may be one controller 4 that receives one cell output voltage signal $V3_{i\_M}$, which represents the output voltage $V_{OUT}$ in this type of topology, and one output voltage reference signal $V3_{i\_REF}$ which represents the desired level of the output voltage $V_{OUT}$. This controller, based on the one cell output voltage signal $V3_{i\_M}$ and the one output voltage reference signal $V3_{i\_REF}$ generates a corresponding output current reference signal for each of the plurality of second converter cells $2_1$-$2_{N2}$ in order to coordinate the output currents $I3_1$-$I3_{N3}$ of the second converter cells such that the output voltage $V_{OUT}$ is in accordance with the one voltage reference signal ($V3_{i\_REF}$ in FIG. 11).

In a multi-cell power converter with an OSEP topology, each of the second converter cells $2_1$-$2_{N3}$ may include a separate controller of the type shown in FIG. 11, wherein each controller 4 only receives the signal $V3_{i\_M}$ representing the output voltage of the corresponding second converter cell $3_i$ and the output voltage reference signal $13_{i\_REF}$ of the respective second converter cell. In this way, the output voltages $V3_1$-$V3_{N3}$ of the individual second converter cells can be controlled independent from each other.

According to one embodiment, the control circuit 222, in the normal mode, is configured to control a timing of switching on and switching off the individual switches 211-214 of the first bridge such that at least some of the switches 211-214 are switched on and/or switched off when the voltage across the respective switch is zero. This is known as zero voltage switching (ZVS).

Referring to FIGS. 8 and 10, the dissipation circuit may include a series circuit with a first switch SW1 and a second switch SW2 and at least one capacitor C1, C2 connected in parallel with one of the switches SW1, SW2. In the second converter cell $2_i$ shown in FIG. 11, at least one of the half-bridges 211, 212 or 213, 214 of the first bridge circuit 211-214 can be operated as a dissipation circuit during the start-up mode. For this, a capacitor is connected in parallel with at least one of the electronic switches of the at least one half-bridge operated as a dissipation circuit.

According to one example, the controller 222, which drives the first and second bridge circuits in the normal mode such that output current $I2_i$ is in accordance with the reference signal $I2_{i\_REF}$, receives a DC link voltage signal $V2_{i\_M}a$ that represents the DC link voltage $V2_i$ and is configured, in the start-up mode, to drive the at least one half-bridge such that power is internally dissipated in the second converter cell.

If, for example, the first half-bridge 211, 212 is used as a dissipation circuit and a capacitor C211 is connected in parallel with electronic switch 211 the controller 222 is configured to drive switch 211 in accordance with switch SW1 shown in FIG. 8 and to drive switch 212 in accordance with switch SW2 shown in FIG. 8 in order to internally dissipate power. According to one example, in the start-up mode, the controller 222 switches off the electronic switches 213, 214 of the second half-bridge, which is not operated as a dissipation circuit. If, for example, half-bridge 211, 212 is used as a dissipation circuit and a capacitor C211 is connected in parallel with electronic switch 211 and a capacitor C212 is connected in parallel with electronic switch 212 the controller 222 is configured to drive switch 211 in accordance with switch SW1 shown in FIG. 9 and to drive switch 212 in accordance with switch SW2 shown in FIG. 9 in order to internally dissipate power. Instead of the first half-bridge 211, 212 the second half-bridge 213, 214 may be used as a dissipation circuit to internally dissipate power during start-up. In this case, a capacitor C213, C214 is connected in parallel with at least one of the electronic switches 213, 214.

According to one example, both half-bridges 211, 212 and 213, 214 of the first bridge circuit are operated as dissipation circuit. In this case, each of the high-side switches 211, 213 has a capacitor C211, C213 connected in parallel or each of the high-side switches 211, 213 and low-side switches 212, 214 has a capacitor C211-C214 connected in parallel. According to one example, the half-bridges 211, 212 and 213, 214, when used as dissipation circuits, are operated synchronously. That is, the high-switches 211, 213 are switched on and off synchronously in each dissipation cycle, and the low-switches 212, 214 are switched on and off synchronously in each dissipation cycle. This avoids a voltage other than zero from being applied to the primary winding $219_P$ and therefore avoids an output voltage other than zero from being generated.

The capacitor connected in parallel with at least one electronic switch of the first half-bridge 211, 212 or the second half-bridge 213, 214 and used to internally dissipate power during start-up may be a discrete capacitor. According to another example, the at least one capacitor is a parasitic capacitor of the electronic switch it is connected in parallel therewith. MOSFETs, for example, have a parasitic capacitance in parallel with a load path (drain-source path). This parasitic capacitance, which includes a drain-source capacitance of the MOSFET, is often referred to as $C_{OSS}$. According to one example, the electronic switches of the first half-bridge 211, 212 and/or the second half-bridge 213, 214 are MOSFETs. In this case, not only the rectifier elements, but also the at least one capacitor used to internally dissipate power during start-up is inherently included in the electronic switch(es).

Figure 12:
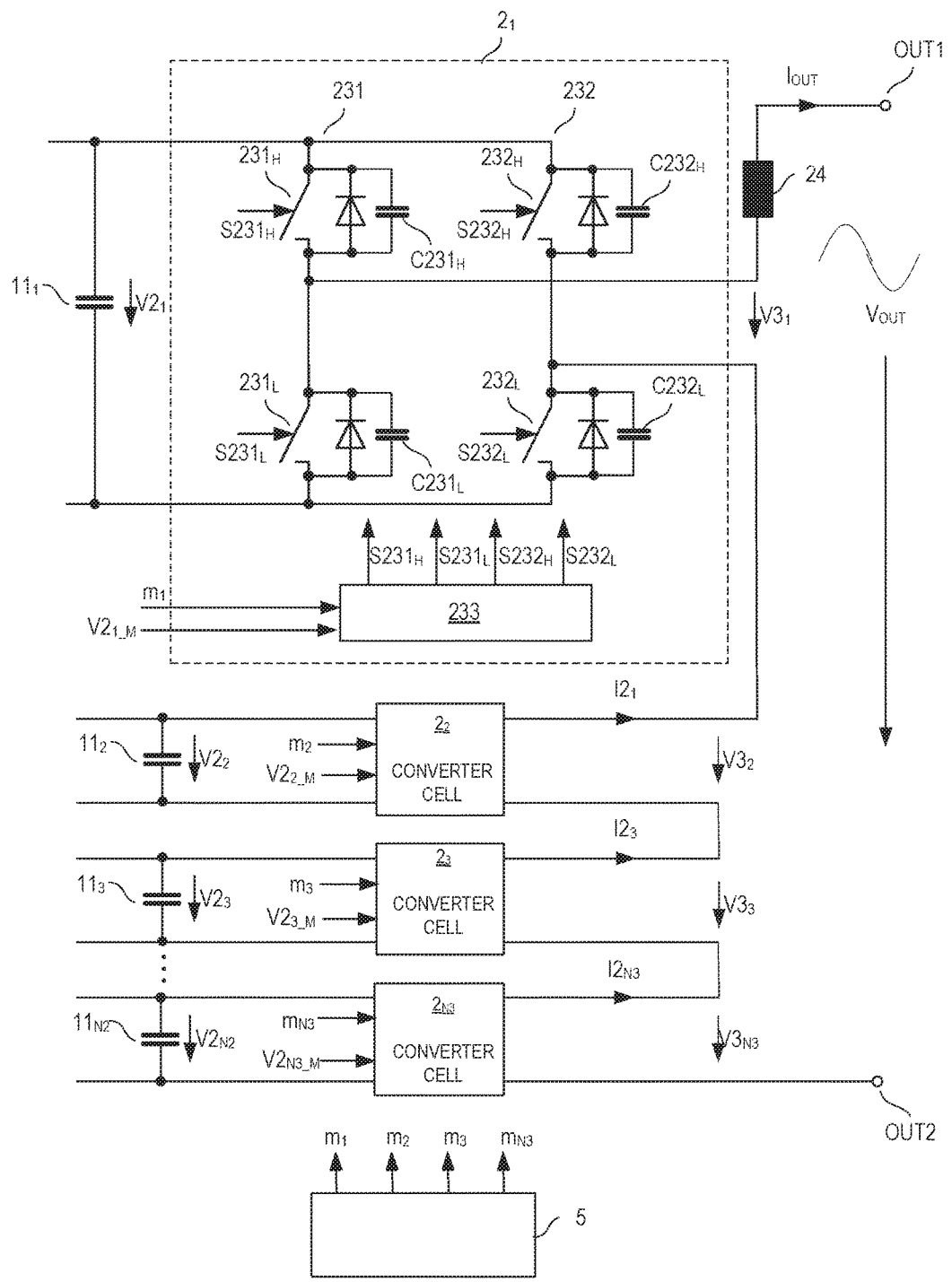
FIG. 12 shows another possible implementation of the second converter cells.

FIG. 12 shows another example of second converter cells $2_1$-$2_{N3}$. This type of second converter cell may be used in a multi-cell power converter with an ISOS topology. In FIG. 12, one converter cell $2_1$ is shown in detail. The other converter cells $2_2$-$2_{N3}$ may be implemented accordingly. The overall topology shown in FIG. 12 is referred to as OS converter in the following.

Referring to FIG. 12, the OS converter may include one inductor 24 connected in series with the cell outputs of the individual converter cells $2_1$-$2_{N3}$. The series circuit with the cell outputs and the inductor 24 is connected between the output nodes OUT1, OUT2 of the multi-cell power converter. Alternatively to having one inductor (which is not shown in FIGS. 1 to 4), the inductor may be distributed over the converter cells such that two or more of the second converter cells $2_1$-$2_{N3}$ each includes an inductor.

In the example shown in FIG. 12, the individual converter cells $2_1$-$2_{N3}$ are implemented with a full-bridge topology. This is explained in detail with reference to second converter cell $2_1$ below. This explanation applies to the other converter cells $2_2$-$2_{N3}$ accordingly. Referring to FIG. 12, converter cell $2_1$ includes a first half-bridge 231 with a high-side switch $231_H$ and a low-side switch $231_L$, and a second half-bridge 232 with a high-side switch $232_H$ and a low-side switch $232_L$. A controller 233 operates these switches $231_H$-$232_L$ by generating drive signals $S231_H$-$S232_L$ for these switches $231_H$-$232_L$ based on an modulation index $m_1$ received from a main controller 5. A cell output of the converter cell $2_1$ is formed by taps of the two half-bridges. The cell input, where the DC link voltage $V2_1$ is received, is formed by those circuit nodes where the two half-bridges 231, 232 are connected in parallel.

The OS converter shown in FIG. 12 can be operated, in the normal mode, to supply an output current $I_{OUT}$ to a power grid connected to the output nodes OUT1, OUT2. In this case, the output voltage $V_{OUT}$ at the output OUT1. OUT2 is defined by the power grid. In other words, the OS converter receives the output voltage $V_{OUT}$ at the output and provides the output current $I_{OUT}$ at the output. The instantaneous level of the output power is defined by the instantaneous level of the output voltage $V_{OUT}$ and the instantaneous level of the output current $I_{OUT}$. The output voltage may have a sinusoidal waveform, as schematically illustrated in FIG. 34. In this case, the OS converter generates the output current $I_{OUT}$ such that a waveform of the output current $I_{OUT}$ is substantially in phase with the output voltage $V_{OUT}$ (or that there is a pre-defined phase difference between the output voltage $V_{OUT}$ and the output current $I_{OUT}$). Further, the OS converter may generate the amplitude of the output current $I_{OUT}$ such that the total DC link voltage $V2_{TOT}$ has a predefined voltage level. An OS converter configured to control the waveform of the output current $I_{OUT}$ to be substantially equal to the waveform of the output voltage $V_{OUT}$ will be referred to as OS converter with a PFC (Power Factor Correction) capability or, briefly, as a second PFC power converter. Such second PFC power converter may be used in a system in which the input voltage $V_{IN}$ is a DC voltage, as shown in FIG. 5C.

In the normal mode, the individual converter cells $2_1$-$2_{N3}$ shown in FIG. 12 act as buck converters. That is, the cell output voltage $V3_1$-$V3_{N3}$ of each converter cell $2_1$-$2_{N3}$ is lower than the DC link voltage $V2_1$-$V2_{N2}$ of the corresponding DC link capacitor $11_1$-$11_{N3}$. The topology of the converter cells shown in FIG. 34 is referred to as full-bridge topology (or full bridge buck topology). The OS converter shown in FIG. 12 can be operated to generate an AC voltage, such as a sine voltage, as the output voltage $V_{OUT}$ from the DC link voltages $V2_1$-$V2_{N2}$. However, it can also be operated to generate a rectified sine voltage or a DC voltage as the output voltage. In this case, the output voltage $V_{OUT}$ is a rectified sine voltage or a DC voltage and the converter cell $2_1$ (and the other converter cells $2_2$-$2_{N3}$) may be simplified by omitting the high-side switch $232_H$ of the second half-bridge 232 and by replacing the low-side switch $232_L$ with a conductor. The converter cell $2_1$ (and each of the other converter cells $2_2$-$2_{N3}$) then only includes the first half-bridge 231, wherein the first half-bridges of the individual converter cells $2_1$-$2_{N3}$ are connected in series. Such modified topology of the converter cells $2_1$-$2_{N3}$ will be referred to as buck topology in the following.

Referring to the above, the controller 233 of the second converter cell $2_1$ (as well as a respective controller in the other converter cells $2_2$-$2_{N3}$), in the normal mode, operates the switches of the first and second half-bridge 231, 232 based on a modulation index received from the main controller 5 such the output current $I_{OUT}$ is in phase with the output voltage $V_{OUT}$ and, optionally, the overall DC link voltage $V2_{TOT}$ has a predefined voltage level. A control scheme for generating the modulation indices $m_1$-$m_{N3}$ by the main controller 5 and a drive scheme for driving the first and second half-bridges in the second converter cells $2_1$-$2_{N3}$ based on the respective modulation indices $m_1$-$m_{N3}$ is commonly known so that no further explanations are required in this regard.

In the OS converter shown in FIG. 12, at least one of the half-bridges of the bridge circuit in the individual second converter cells $2_1$-$2_{N3}$ can be operated as a dissipation circuit during the start-up mode. For this, a capacitor is connected in parallel with at least one of the electronic switches of the at least one half-bridge operated as a dissipation circuit. This is explained with reference to the second converter cell $2_1$.

According to one example, the controller 233, which drives the first and second half-bridges in the normal mode based on the modulation index $m_1$ is configured, in the start-up mode, to drive the at least one half-bridge such that power is internally dissipated in the second converter cell $2_1$. According to one example, the controller 233 receives a DC link voltage signal $V2_{1\_M}$ that represents the DC link voltage $V2_1$ (the other second converter cells $2_2$-$2_{N3}$ may receive corresponding signals $V2_{2\_M}$-$V2_{N3\_M}$ to internally dissipate power based on the DC link voltage) and is configured, in the start-up mode, to drive the at least one half-bridge such that power is internally dissipated in the second converter cell. If, for example, the first half-bridge 231 is used as a dissipation circuit and a capacitor $C231_H$ is connected in parallel with electronic switch $231_H$ the controller 233 is configured to drive switch $231_H$ in accordance with switch SW1 shown in FIG. 8 and to drive switch $231_L$ in accordance with switch SW2 shown in FIG. 8 in order to internally dissipate power. According to one example, in the start-up mode, the controller 233 switches off the electronic switches $232_H$, $232_L$ of the second half-bridge 232, which is not operated as a dissipation circuit. If, for example, half-bridge 231 is used as a dissipation circuit and a capacitor $C231_H$ is connected in parallel with electronic switch $231_H$ and a capacitor $C231_L$ is connected in parallel with electronic switch $231_L$ the controller 233 is configured to drive switch $231_H$ in accordance with switch SW1 shown in FIG. 9 and to drive switch $231_L$ in accordance with switch SW2 shown in FIG. 9 in order to internally dissipate power. Instead of the first half-bridge 213 the second half-bridge 232 may be used as a dissipation circuit to internally dissipate power during start-up. In this case, a capacitor $C232_H$, $C232_L$ is connected in parallel with at least one of the electronic switches $232_H$, $232_L$.

The capacitor connected in parallel with at least one electronic switch of the first half-bridge 231 or the second half-bridge 232 and used to internally dissipate power during start-up may be a discrete capacitor or a parasitic capacitor of the at least one electronic switch.

According to one example, both half-bridges 231, 232 of the bridge circuit shown in FIG. 12 are operated as dissipation circuit. In this case, each of the high-side switches $231_H$, $232_H$ has a capacitor $C231_H$, $C232_H$ connected in parallel or each of the high-side switches $231_H$, $232_H$ and low-side switches has a capacitor $C231_H$, $C232_H$, $C231_L$, $C232_L$ connected in parallel. According to one example, the half-bridges 231, 232, when used as dissipation circuits, are operated synchronously. That is, the high-switches $231_H$, $232_H$ are switched on and off synchronously in each dissipation cycle, and the low-switches $231_L$, $232_L$ are switched on and off synchronously in each dissipation cycle.

Figure 13:
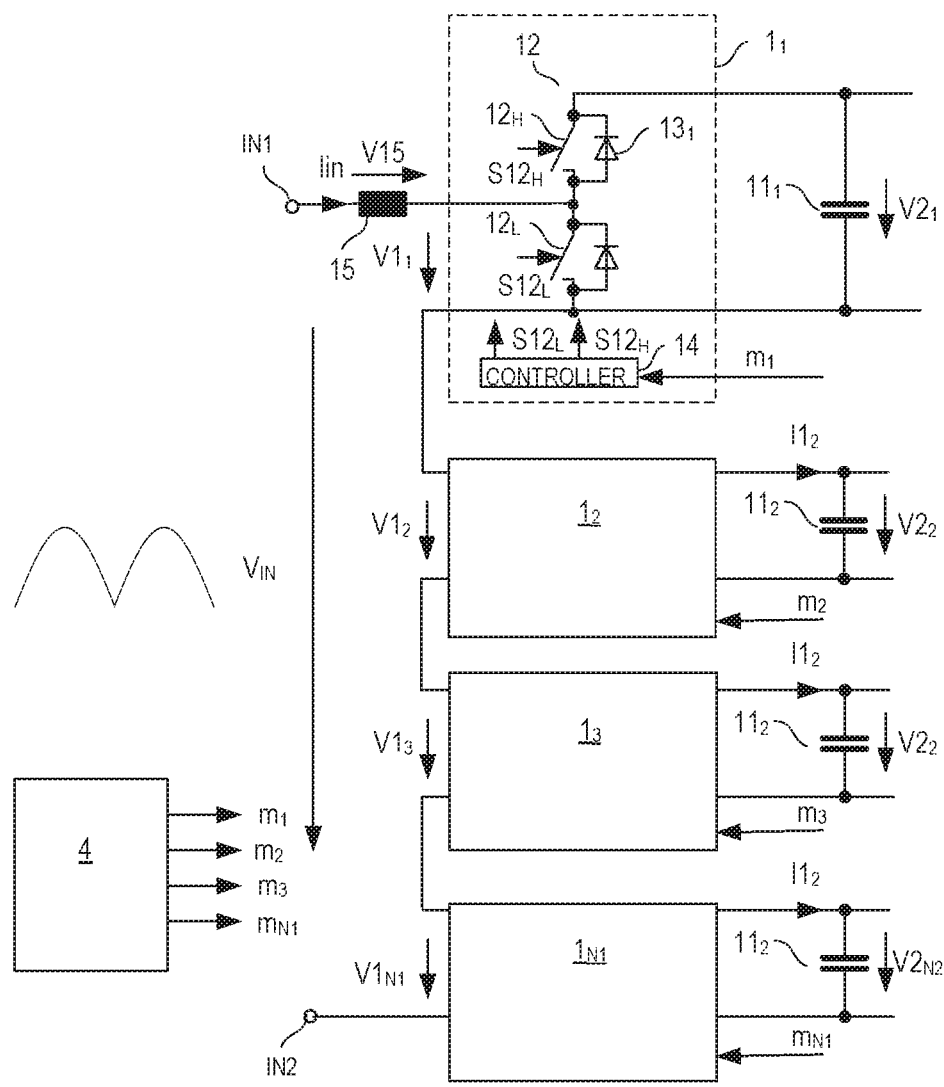
FIG. 13 shows one possible implementation of the first converter cells.

FIG. 13 shows one example of how the first converter cells $1_1$-$1_{N1}$ may be implemented. In particular, FIG. 13 shows one example of first converter cells $1_1$-$1_{N1}$ that are configured, in the normal mode, to generate the total DC link voltage $V2_{TOT}$ with a higher voltage level than the peak voltage level of the input voltage $V_{IN}$. The circuit with these first converter cells $1_1$-$1_{N1}$ is referred to as IS converter in the following. In this example, the individual first converter stages $1_1$-$1_{N1}$ are each implemented with a boost converter topology. In FIG. 13, only one of the first converter cells $1_1$-$1_{N1}$ namely the first converter cell $1_1$ is shown in detail. The other first converter cells $1_2$-$1_{N1}$ are implemented with the same topology. Thus, the explanation provided in context with the first converter cell $1_1$ equivalently applies to the other first converter cells $1_2$-$1_{N1}$.

Referring to FIG. 13, the first converter cell $1_1$ includes a half-bridge 12 with a low-side switch $12_L$ and a high-side switch $12_H$. The high-side switch $12_H$ is optional and may be replaced with a rectifier element such as, for example, a diode. Referring to FIG. 12, the high-side switch $12_H$ may be implemented with an electronic switch and a parallel rectifier element. The electronic switch is operated as a synchronous rectifier that switches on each time the parallel rectifier element is conducting. Thus, the high-side switch $12_H$ operates like an active rectifier element. The low side switch $12_L$ may also be implemented with an electronic switch and a parallel rectifier element. However, the rectifier element is optional in this embodiment. The high-side switch $12_H$ and the low-side switch $12_L$ can be implemented as electronic switches. Examples of those switches include, but are not restricted to, MOSFETs (Metal Oxide Semiconductor Field-Effect Transistors). IGBTs (Insulated Gate Bipolar Transistors), JFETs (Junction Field-Effect Transistors), BJTs (Bipolar Junction Transistor), HEMTs (High Electron Mobility Transistor), GaN-HEMTs, or the like. Some types of these electronic switches, such as MOSFETs, include an integrated diode (body diode) which may be used as the respective rectifier element shown in FIG. 12. The rectifier element connected in parallel with the high-side switch $12_H$ or being inherently included in the high-side switch forms the rectifier element $13_1$ shown in FIG. 7 that causes, in the start-up mode, the input voltage $V_{IN}$ to be coupled to the DC link capacitor series circuit in the start-up mode.

The low-side switch $12_L$ is connected between cell input nodes of the first converter cell $1_1$. During start-up, the high-side switch $12_H$ and the low-side switch $12_L$ are not actively controlled and in the off-state, so that the low-side switch $12_L$ and the corresponding rectifier element are without effect in the start-up mode.

Referring to FIG. 13, the IS converter further includes at least one inductor 15 such as a choke. In the embodiment shown in FIG. 13, the individual first converter cells $1_1$-$1_{N1}$ share the inductor 15. That is, there is one inductor which is connected in series with low-side switch $12_L$ in the first converter cell $1_1$ and the correspondent low-side switches in the other converter cells $1_2$-$1_{N1}$. According to another embodiment (not shown) each converter cell $1_1$-$1_{N1}$ includes one inductor connected between one cell input node and the circuit node common to the high-side switch and the low-side switch in the respective converter cell.

Referring to FIG. 13, the first converter cell $1_1$ further includes a controller 14 which is configured to control the operation of the low-side switch $12_L$ and the high-side switch $12_H$ in the normal mode. In case the high-side switch $12_H$ is replaced with a passive rectifier element, the controller 14 only controls operation of the low-side switch $12_L$. This controller 14 may start to receive power from the corresponding DC link capacitor $11_1$ during start-up and corresponds to controller $14_1$ shown in FIG. 7.

According to one example, the controller 14 in the first converter cell $1_1$ and corresponding controllers in the other converter cells $1_2$-$1_{N1}$ are controlled by a controller 4. This controller 4 will also be referred to as main controller of the first power converter 10 in the following. According to one embodiment, the main controller 4, via the controller 14 in the first converter cell 1 and corresponding controllers in the other converter cells $1_2$-$1_{N1}$ is configured to control (regulate) the total DC link voltage $V2_{TOT}$. According to one embodiment, the main controller 4 is further configured to control a current waveform of the input current IN such that the waveform of the input current $I_{IN}$ substantially corresponds to the waveform of the input voltage $V_{IN}$. A phase difference between the waveform of the input voltage $V_{IN}$ and the resulting waveform of the input current IN may be zero or may be different from zero. Controlling the input current $I_{IN}$ to have substantially the same waveform as the input voltage $V_{IN}$ may help to control the power factor of the input power PIN received at the input IN1, IN2. An IS converter configured to control the waveform of the input current IN to substantially be equal to the waveform of the input voltage $V_{IN}$ can be referred to as a first power converter 10 with a PFC (Power Factor Correction) capability or, briefly, as a first PFC power converter 10. This type of converter is known so that no further explanations are required in this regard.

Figure 14:
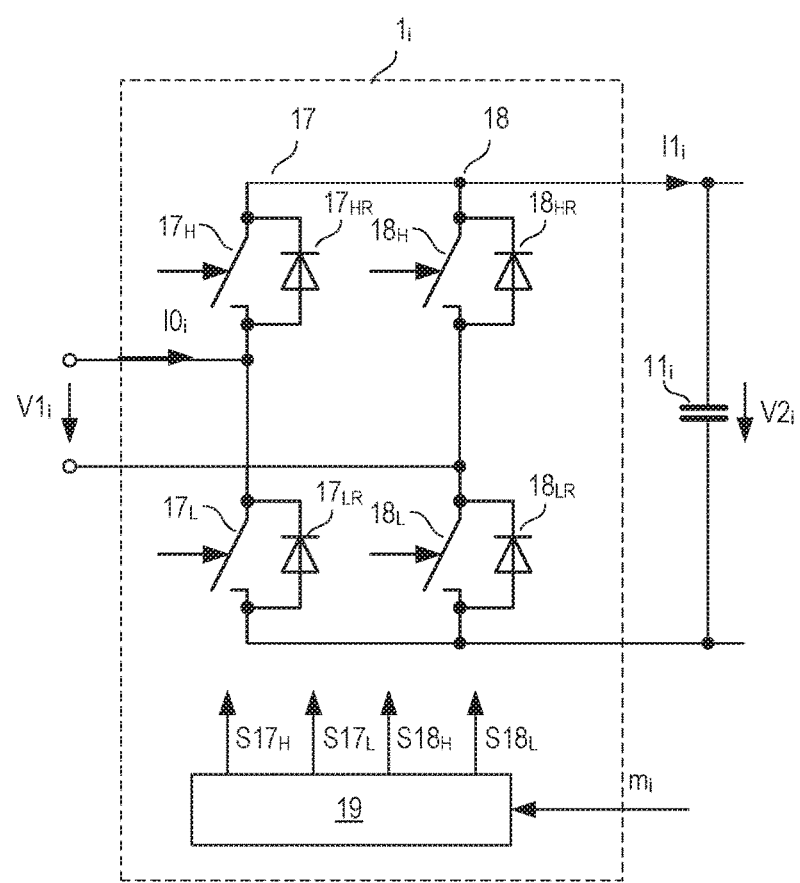
FIG. 14 shows another possible implementation of the first converter cells.

FIG. 14 shows one embodiment of a converter cell $1_i$ which may be used in a multi-cell converter with IS topology of the type shown in FIG. 13 when the multi-cell converter receives a sinusoidal voltage as the input voltage $V_{IN}$. That is, each of the converter cells shown in FIG. 13 may be replaced with a converter cell of the type shown in FIG. 14. In FIG. 24, $V1_i$ denotes the cell input voltage, $V2_i$ denotes the DC link voltage at the associated DC link capacitor $11_i$, $11_i$ denotes the cell output current (which is the current into the circuit node to which the DC link capacitor $11_i$ is connected thereto).

Referring to FIG. 14, the converter cell $1_i$ includes a bridge circuit with two half-bridges 17, 18. Each half-bridge 17, 18 includes a high-side switch $17_H$, $18_H$ and a low-side switch $17_L$, $18_L$. Load paths of the high-side switch $17_H$, $18_H$ and the low-side switch $17_L$, $18_L$ of each half-bridge 17, 18 are connected in series, whereas these series circuits are each connected in parallel with DC link capacitor $11_i$. Each half-bridge 17, 18 includes a tap, which is a circuit node common to the load paths of the high-side switch $17_H$, $18_H$, and the low-side switch $17_L$, $18_L$ of the respective half-bridge 17, 18. A first cell input node of the first converter cell $1_i$ is connected to the tap of the first half-bridge 17, and a second cell input node of the first converter cell $1_i$ is connected to the tap of the second half-bridge 18. An IS converter implemented with first converter cells of the type shown in FIG. 14 can directly process a sine voltage provided from a power grid so that a rectifier circuit 100 (see FIG. 6), which may cause losses, is not required.

Referring to 14, the electronic switches $17_H$, $17_L$, $18_H$, $18_L$ of the first and second half-bridge 17, 18 may each have a rectifier element $17_{HR}$, $17_{LR}$, $18_{HR}$, $18_{LR}$ connected in parallel therewith. Dependent on which type of electronic switch is used to implement the electronic switches of the first and second half-bridge 17, 18 these rectifier elements are either discrete devices or inherently included in the electronic switches. During start-up, the electronic switches are not actively controlled by the control circuit so that only the rectifier elements $17_{HR}$, $17_{LR}$, $18_{HR}$, $18_{LR}$ are active. These rectifier elements act as a bridge rectifier configured to rectify the cell input voltage $V1_i$, which is a share of the power converter input voltage $V_{IN}$. During a positive half-wave of the cell input voltage $V1_i$ rectifier elements $17_{HR}$ and $18_{LR}$ are forward biased if the instantaneous absolute value of the cell input voltage $V1_i$ (which is positive during the positive halfwave) is higher than the DC link voltage $V2_i$, and during a negative halfwave of the cell input voltage $V1_i$ rectifier elements $17_{LR}$ and $18_{HR}$ are forward biased if the instantaneous absolute value of the cell input voltage $V1_i$ (which is negative during the negative halfwave) is higher than the DC link voltage $V2_i$. Thus, the DC link voltage $V2_i$ essentially equals a peak voltage of the sinusoidal input voltage $V_{IN}$. During the positive halfwave, the function of rectifier element $13_i$ shown in FIG. 7 (wherein 13, denotes an arbitrary one of the rectifier elements $13_1$-$13_{N1}$) is realized by rectifier elements $17_{HR}$ and $18_{LR}$, and during the negative halfwave, the function of rectifier element $13_i$ shown in FIG. 7 is realized by rectifier elements $17_{LR}$ and $18_{HR}$.

In the example multi-cell power converter explained above, the number of first converter cells $1_1$-$1_{N1}$ equals the number of DC link capacitors $11_1$-$11_{N2}$ and equals the number of second converter cells $2_1$-$2_{N3}$ so that each first converter cell $1_1$-$1_{N1}$ is coupled to a corresponding DC link capacitor $11_1$-$11_{N1}$ and each DC link capacitor $11_1$-$11_{N1}$ is coupled to a corresponding second converter cell $2_1$-$2_{N3}$. This, however, is only an example. Internally dissipating power in at least one second converter cell is not restricted to this specific type of multi-cell power converter, but may also be employed in a multi-cell power converter in which the number of first converter cells is not equal the number of second converter cells.

Figure 15:
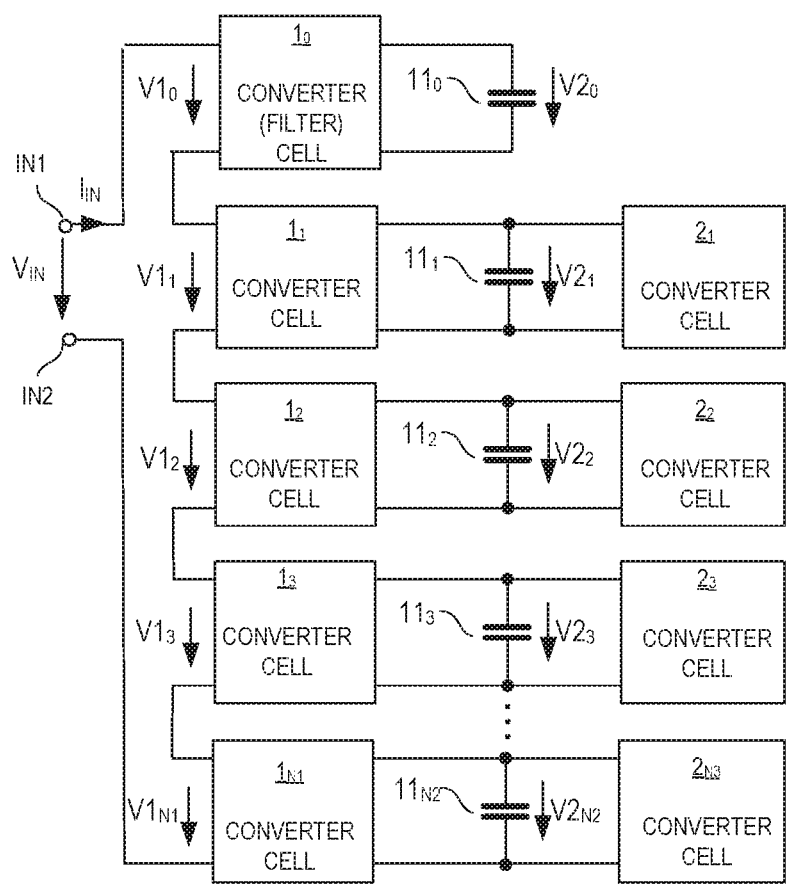
FIG. 15 shows a circuit diagram of a multi-cell power converter with a plurality of first converter cells and a plurality of second converter cells according to another example.

FIG. 15 shows an example of a multi-cell power converter with more first converter cells $1_0$-$1_{N1}$ than second converter cells $2_1$-$2_{N3}$. Cell inputs of the first converter cells $1_0$-$1_{N1}$ are connected in series between the input nodes IN1, IN2 of the multi-cell power converter. Each of the first converter cells $1_0$-$1_{N1}$ is coupled to a corresponding DC link capacitor $11_0$-$11_{N2}$, but not each of the DC link capacitors $11_0$-$11_{N2}$ has a second converter cell $2_1$-$2_{N3}$ connected thereto. More specifically, one capacitor $11_0$ of the DC link capacitors is only coupled to a first converter cell $1_0$ but not to a second converter cell. This first converter cell may be referred to as filter cell and may be configured, in an IS converter with PFC function, to assist shaping the input current $I_{IN}$. An IS converter with a filter cell is known so that no further explanations are required in this regard.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections. etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power converter circuit, comprising:
   a plurality of first converter cells, a plurality of second converter cells, and a plurality of DC link capacitors,
   wherein each of the plurality of first converter cells is coupled to a corresponding one of the plurality of DC link capacitors,
   wherein each of the plurality of second converter cells is coupled to a corresponding one of the plurality of DC link capacitors,
   wherein at least one of the plurality of second converter cells is configured to, during start-up of the power converter, internally dissipate power received from the corresponding DC link capacitor while a cell output power of the at least one of the plurality of second converter cells is substantially zero,
   wherein:
   the at least one of the plurality of second converter cells is configured to measure a DC link voltage of the corresponding DC link capacitor and to internally dissipate power received from the corresponding DC link capacitor only if the measured DC link voltage is higher than a predefined voltage threshold; and/or
   the at least one of the plurality of second converter cells is configured to measure the DC link voltage of the corresponding DC link capacitor and to increase the power that is internally dissipated as the measured DC link voltage increases; and/or
   the at least one of the plurality of second converter cells is configured to internally dissipate power in a plurality of successive dissipation cycles, each dissipation cycle comprising charging a first internal capacitor to store energy in the first internal capacitor and dissipating the stored energy.

2. The power converter circuit of claim 1,
   wherein dissipating the stored energy comprises switching on a first electronic switch connected in parallel with the first internal capacitor.

3. The power converter circuit of claim 2, wherein the first internal capacitor is a parasitic capacitor of the first electronic switch.

4. The power converter circuit of claim 3, wherein the first electronic switch is a transistor.

5. The power converter circuit of claim 2,
   wherein the at least one of the plurality of second converter cells comprises a power converter connected between the corresponding DC link capacitor and the cell output and is configured to, in a normal operation of the power converter circuit, receive power from the corresponding DC link capacitor and provide a cell output power different from zero, and
   wherein the first electronic switch is part of the power converter.

6. The power converter circuit of claim 1,
   wherein charging the first internal capacitor comprises switching on a second electronic switch connected in series with the first internal capacitor,
   wherein a series circuit comprising the first internal capacitor and the second electronic switch is coupled to the corresponding DC link capacitor.

7. The power converter circuit of claim 1, wherein the at least one of the plurality of second converter cells is configured to adjust a dissipation frequency at which the dissipation cycles occur dependent on the DC link voltage of the corresponding DC link capacitor.

8. The power converter circuit of claim 7, wherein the at least one of the plurality of second converter cells is configured to adjust the dissipation frequency such that the dissipation frequency increases as a difference between the DC link voltage and a reference voltage increases.

9. The power converter circuit of claim 1,
   wherein, in a normal operation different from the start-up, each of the plurality of first converter cells is configured to regulate the DC link voltage across its corresponding DC link capacitor.

10. A method, comprising:
    in a power converter circuit comprising a plurality of first converter cells, a plurality of second converter cells, and a plurality of DC link capacitors, wherein each of the plurality of first converter cells is coupled to a corresponding one of the plurality of DC link capacitors and wherein each of the plurality of second converter cells is coupled to a corresponding one of the plurality of DC link capacitors, during start-up of the power converter circuit, by at least one of the plurality of second converter cells, internally dissipating power received from the corresponding DC link capacitor while a cell output power of the at least one of the plurality of second converter cells is substantially zero, wherein internally dissipating power by the at least one of the plurality of second converter cells comprises:
measuring a DC link voltage of the corresponding DC link capacitor and internally dissipating power received from the corresponding DC link capacitor only if the measured DC link voltage is higher than a predefined voltage threshold; and/or
measuring the DC link voltage of the corresponding DC link capacitor and increasing the power that is internally dissipated as the measured DC link voltage increases; and/or
internally dissipating power in a plurality of successive dissipation cycles, each dissipation cycle comprising charging a first internal capacitor to store energy in the first internal capacitor and dissipating the stored energy.

11. The method of claim 10,
wherein dissipating the stored energy comprises switching on a first electronic switch connected in parallel with the first internal capacitor.

12. The method of claim 11, wherein the first internal capacitor is a parasitic capacitor of the first electronic switch.

13. The method of claim 12, wherein the first electronic switch is a transistor.

14. The method of claim 11,
wherein the at least one of the plurality of second converter cells comprises a power converter connected between the corresponding DC link capacitor and the cell output and is configured to, in a normal operation of the power converter circuit, receive power from the corresponding DC link capacitor and provide a cell output power different from zero, and
wherein the first electronic switch is part of the power converter.

15. The method of claim 11,
wherein charging the first internal capacitor comprises switching on a second electronic switch connected in series with the first internal capacitor,
wherein a series circuit comprising the first internal capacitor and the second electronic switch is coupled to the corresponding DC link capacitor.

16. The method of claim 11,
wherein internally dissipating power by the at least one of the plurality of second converter cells comprises adjusting a dissipation frequency at which the dissipation cycles occur dependent on the DC link voltage of the corresponding DC link capacitor.

17. The method of claim 16,
wherein adjusting the dissipation frequency comprises increasing the dissipation frequency as a difference between the DC link voltage and a reference voltage increases.

18. The method of claim 10, further comprising:
in a normal operation different from the start-up, by each of the plurality of first converter cells regulating the DC link voltage across its corresponding DC link capacitor.

19. A power converter circuit, comprising:
a plurality of first converter cells, a plurality of second converter cells, and a plurality of DC link capacitors,
wherein each of the plurality of first converter cells is coupled to a corresponding one of the plurality of DC link capacitors,
wherein each of the plurality of second converter cells is coupled to a corresponding one of the plurality of DC link capacitors,
wherein at least one of the plurality of second converter cells is configured to, during start-up of the power converter, internally dissipate power received from the corresponding DC link capacitor while a cell output power of the at least one of the plurality of second converter cells is substantially zero,
wherein the at least one of the plurality of second converter cells is configured to internally dissipate power in each of two half-bridges of a bridge circuit,
wherein each half-bridge comprises a first electronic switch connected in series with a second electronic switch and a first internal capacitor connected in parallel with the respective first electronic switch, and
wherein internally dissipating power comprises charging the first internal capacitor in each of the first and second half-bridge to store energy in the first internal capacitor of each of the first and second half-bridge, and dissipating the stored energy.

20. The power converter of claim 19,
wherein charging the first internal capacitor in each of the first and second half-bridge comprises synchronously charging the first internal capacitor in the first half-bridge and the first internal capacitor in the second half-bridge, and
wherein dissipating the stored energy comprises synchronously dissipating energy stored in the first internal capacitor of the first half-bridge and energy stored in the first internal capacitor of the second half-bridge.

21. A method, comprising:
in a power converter circuit comprising a plurality of first converter cells, a plurality of second converter cells, and a plurality of DC link capacitors, wherein each of the plurality of first converter cells is coupled to a corresponding one of the plurality of DC link capacitors and wherein each of the plurality of second converter cells is coupled to a corresponding one of the plurality of DC link capacitors,
during start-up of the power converter circuit, by at least one of the plurality of second converter cells, internally dissipating power received from the corresponding DC link capacitor while a cell output power of the at least one of the plurality of second converter cells is substantially zero,
wherein internally dissipating power by the at least one of the plurality of second converter cells comprises dissipating power in each of two half-bridges of a bridge circuit,
wherein each half-bridge comprises a first electronic switch connected in series with a second electronic switch and a first internal capacitor connected in parallel with the respective first electronic switch, and
wherein internally dissipating power comprises charging the first internal capacitor in each of the first and second half-bridge to store energy in the first internal capacitor of each of the first and second half-bridge, and dissipating the stored energy.

22. The method of claim 21,
wherein charging the first internal capacitor in each of the first and second half-bridge comprises synchronously charging the first internal capacitor in the first half-bridge and the first internal capacitor in the second half-bridge, and wherein dissipating the stored energy comprises synchronously dissipating energy stored in the first internal capacitor of the first half-bridge and energy stored in the first internal capacitor of the second half-bridge.

* * * * *